United States Patent [19]

Aomi et al.

[11] Patent Number: 5,064,474

[45] Date of Patent: Nov. 12, 1991

[54] PROCESS FOR REMOVING FINE PARTICLES FROM ARTICLES OF FLUORINE-CONTAINING RESIN

[75] Inventors: Hideki Aomi, Katano; Tomizo Soda, Settsu; Mitsushi Itano, Sendai, all of Japan

[73] Assignee: Daikin Industries, Ltd., Osaka, Japan

[21] Appl. No.: 586,775

[22] Filed: Sep. 24, 1990

[30] Foreign Application Priority Data

Sep. 26, 1989 [JP] Japan .................................. 1-251531

[51] Int. Cl.$^5$ ................................................ B08B 3/08
[52] U.S. Cl. ......................................... 134/2; 134/11; 134/19; 134/26; 134/30; 134/31
[58] Field of Search .............. 134/2, 11, 19, 21, 22.14, 134/22.19, 26, 30, 31, 42; 252/88; 528/480, 483, 491

[56] References Cited

U.S. PATENT DOCUMENTS 4,711,256 12/1987 Kaiser ..................................... 134/26
4,787,941 11/1988 Laplaca ................................. 134/26

FOREIGN PATENT DOCUMENTS 2059754 4/1981 United Kingdom .................. 134/19

*Primary Examiner*—Theodore Morris
*Assistant Examiner*—Saeed Chaudhry
*Attorney, Agent, or Firm*—Larson and Taylor

[57] ABSTRACT

The invention provides a method for removing the fine particles deposited on an article of fluorine-containing resin, the method comprising conducting at least one of the procedures of:
(i) maintaining the article of fluorine-containing resin at a high temperature,
(ii) maintaining the article in the atmosphere of fluorine-containing gas, and
(iii) bringing the article into contact with a polar solvent or an aqueous solution of polar solvent.

7 Claims, No Drawings

PROCESS FOR REMOVING FINE PARTICLES FROM ARTICLES OF FLUORINE-CONTAINING RESIN

The present invention relates to a process for removing particulate components deposited as impurities on the molded products of fluorine-containing resin.

Currently even fine particles of submicron size must be removed from the molded products of fluorine-containing resin in the field of the so-called high technology. Further, a demand for higher degree of cleaning is expected to increase.

For example, containers made of fluorine-containing resin are currently used for holding an agent for wet etching in production of semiconductors, i.e. representative products in the field of the high technology. These containers are usually cleaned with a dilute aqueous solution of a surfactant, strong acid, ultrapure water or the like, or when required, may be cleaned by supersonic treatment or immersion. These methods, however, can not achieve a satisfactory level of cleaning on containers of fluorine-containing resin, compared with the level on containers of polyethylene and therefore may be unempolyable for containers for holding an agent for wet etching or the like.

More specifically, the containers of fluorine-containing resin for holding a 50% aqueous solution of HF to be used in the manufacture of semiconductors must be cleaned to such an extent that after cleaning, 10 particles or less are contained in one milliliter of the solution in terms of the particles not smaller than 0.3 $\mu$m in particle size, and that after cleaning, one particle or less is contained in one milliliter thereof in terms of the particles not smaller than 0.5 $\mu$m in particle size. The cleaning with ultrapure water can not attain the above levels at all.

Use of containers of fluorine-containing resin is limited because they remain difficult to clean. Consequently such containers may become substantially out of use when a higher cleaning level is set in future.

It is an object of the present invention to provide a method for removing the particulate components as impurities from the molded products of fluorine-containing resin.

Other objects and features of the invention will become apparent from the following description.

In view of the aforesaid state of the art, we conducted extensive research and found that the fine particles can be effectively removed from an article of fluorine-containing resin when the article is maintained at a high temperature.

Our another finding was that a similar particle-removing effect can be also produced when the article is maintained in the atmosphere of a specific fluorine-type gas.

Our additional finding was that a similar particle-removing effect can be also achieved when the article is brought into contact with a specific solvent.

The present invention has been accomplished based on these novel findings.

According to the the present invention, there are provided:

(1) a method for removing the fine particles deposited on an article of fluorine-containing resin, the method comprising conducting at least one of the procedures of:
(i) maintaining the article of fluorine-containing resin at a high temperature,
(ii) maintaining the article in the atmosphere of fluorine-type gas, and
(iii) bringing the article into contact with a polar solvent or an aqueous solution of polar solvent;

(2) a method as defined above in item (1) in which the article is maintained at a temperature of not lower than 150° C. in the procedure (i);

(3) a method as defined above in item (1) in which the fluorine-type gas used in the procedure (ii) is a type of gas capable of acting as a fluorinating agent or an oxidizing agent;

(4) a method as defined above in item (3) in which the fluorine-type gas used in the procedure (ii) is at least one gas selected from the group consisting of gases of $F_2$, $ClF_5$, $ClF_3$, $ClF$, $BrF_5$, $BrF_3$, $BrF$, $ClO_3F$, $SF_4$, $O_2F_2$ and $NF_3$, the gas being one diluted or not diluted with an inactive gas;

(5) a method as defined above in item (3) or (4) in which the gas is maintained at a temperature higher than room temperature in the procedure (ii);

(6) a method as defined above in item (1) in which the polar solvent used in the procedure (iii) is at least one solvent selected from the group consisting of fluorine-containing carboxylic acids represented by the formula $R_fCOOH$ (wherein $R_f$ is a fluorine-containing hydrocarbon group having 3 to 20 carbon atoms) and ketones represented by the formula $R^1COR^2$ (wherein $R^1$ and $R^2$ are the same or different and each represent an alkyl group having 1 to 5 carbon atoms); and (7) a method as defined above in item (1) in which the article is cleaned at least once with ultrapure water and/or with a cleaning agent before or after, or both before and after, conducting at least one of the procedures (i), (ii) and (iii).

The methods of the invention essentially comprise subjecting an article of fluorine-containing resin to at least one of the procedures (i), (ii) and (iii). The procedures will be described below in greater detail.

I. Procedure (i)

In this procedure, an article of fluorine-containing resin is maintained at a high temperature ranging from 100° C. to a temperature lower than the melting point of the article, preferably about 150° to about 260° C., to vaporize or scatter away the particles. The vaporization and scattering of particles can be beneficially accelerated by conducting an additional procedure such as rotation of article, agitation of atmosphere gas, spray of atmosphere gas, etc. When the article is heated in air, a reaction product of particles and oxygen may deposit on the article at a high temperature, and the fluorine-containing resin may become impaired in properties. To avoid this possibility, preferably the article is, for example, placed into a heating oven and heated in the atmosphere of inactive gas. The longer the retention time at a high temperature, the higher the degree of cleaning is but with economical disadvantage. The retention time is not specifically limited and can be suitably determined depending on the degree of contamination of article, the required level of cleaning, etc. Usually it is about 10 to about 30 minutes.

The procedure (i) may be executed either on a molded product of fluorine-containing resin or during the molding process of fluorine-containing resin.

II. Procedure (ii)

An article of fluorine-containing resin is maintained in the atmosphere of fluorine-type gas in this procedure.

Beneficially the removal of particles can be accelerated by performing an additional procedure such as rotation of article, agitation of atmosphere gas, spray of atmosphere gas, etc. In case the article of fluorine-containing resin is a container, the fluorine-type gas may be filled into the container. Useful fluorine-type gases include gases capable of acting as a fluorinating agent or an oxidizing agent. Specific examples of such gases are gases of $F_2$, $ClF_5$, $ClF_3$, $ClF$, $BrF_5$, $BrF_3$, $BrF$, $ClO_3F$, $SF_4$, $O_2F_2$, $NF_3$, etc. These gases are usable singly or at least two of them can be used in mixture. The gases may be used after dilution with an inactive gas. Examples of useful inactive gases for dilution are nitrogen, argon, helium, etc. A preferred concentration of the fluorine-type gas diluted with inactive gas is not lower than 0.1% by volume. The temperature of the fluorine-type gas atmosphere may be room temperature and is preferably elevated to accelerate the cleaning. The maximum elevated temperature is lower than the melting point of the article. The longer the retention time in the fluorine-type gas atmosphere, the higher the degree of cleaning is. However, the longer retention time is economically disadvantageous. The retention time, although suitably determinable depending on the degree of contamination of article, the required level of cleaning, etc., is usually not shorter than 1 hour, preferably about 4 to 12 hours, in performing the procedure without heating, but about 10 to about 30 minutes in performing the procedure with heating.

The cleaning in the atmosphere of fluorine-type gas may be effected either on a molded product of fluorine-containing resin or during the molding process of fluorine-containing resin.

III. Procedure (iii)

In this procedure, an article of fluorine-containing resin is cleaned by being brought into contact with a polar solvent or an aqueous solution of polar solvent (hereinafter referred to simply as "solvent" if not necessary). Examples of polar solvents useful in this procedure are fluorine-containing carboxylic acids represented by the formula $R_fCOOH$ (wherein $R_f$ is a fluorine-containing hydrocarbon group having 3 to 20 carbon atoms, preferably 5 to 9 carbon atoms); ketones represented by the formula $R^1COR^2$ (wherein $R^1$ and $R^2$ are the same or different and each represent an alkyl group having 1 to 5 carbon atoms); alcohols; amines and salts thereof; sulfonic acids; phosphoric acids and salts thereof; alkylene oxides; etc. Stated more specifically, the article is brought into contact with the solvent as by immersion of the article in the solvent and standing, by intensively spraying the solvent over the article, by causing the flow of the solvent or the movement of the article in order to promote the removal of particles, etc. Such flow or movement can be brought about as by shaking the solvent in the article (in case of container), or by immersing the article (in case of container) in the solvent and stirring the solvent or subjecting the solvent to circulating movement. As the temperature of the solvent is raised during the cleaning, a higher cleaning effect is produced but with economical disadvantage. For this reason, the temperature of the solvent is usually in the range of about 35° to about 40° C.

The degree of cleaning on articles of fluorine-containing resin can be also increased by performing an additional cleaning procedure at least once with ultrapure water and/or with a cleaning agent before or after, or both before and after, carrying out at least one of the procedures (i), (ii) and (iii). Useful cleaning agents include:

(a) acids and alkali-type agents such as aqueous solutions containing at least one species selected from HF, $NH_4F$, HCl, $HNO_3$, $H_2O_2$, $H_2SO_4$, $H_3PO_4$ and $NH_3$; and (b) organic solvents such as trichloroethylene, methyl alcohol, ethyl alcohol, isopropyl alcohol, acetone, etc.

The foregoing cleaning agents are stored in containers or tanks made of fluorine-containing resin or transported in pipes made of fluorine-containing resin for use in the field of manufacture of semiconductors.

The degree of cleaning on articles of fluorine-containing resin can be also increased by conducting additional cleaning at least once with an aqueous solution of electrolyte at a high concentration (not lower than 0.5% by weight) before or after, or both before and after, performing at least one of the procedures (i), (ii) and (iii). Examples of useful electrolytes are $NH_4Cl$, $NH_4F$, KCl, KF, NaCl, $MgCl_2$, $MgCO_3$, $ZnCl_2$, $ZnSO_4$, $FeCl_3$, $AlCl_3$, $Al_2(SO_4)_3$, etc.

The methods of the present invention are suitable for removing the fine particles from the fluorine-containing resin article which must be cleaned to a great extent, particularly articles of fluorine-containing resin such as containers, tanks, pipes, tubes, wafer carriers, etc. for use in the field of manufacture of semiconductors.

The following great advantages can be offered by cleaning an article of fluorine-containing resin according to the present invention.

(A) The methods of the invention can produce a cleaning effect to an extent heretofore unattainable by conventional techniques, more specifically, to such level that after cleaning, 10 particles or less are contained in one milliliter of the solution held in a container of fluorine-containing resin in terms of the particles not smaller than 0.3 μm in particle size, and that after cleaning, one particle or less is contained in one milliliter thereof in the container in terms of particles not smaller than 0.5 μm in particle size. Therefore the methods of the invention can meet the requirement for higher cleaning levels to be expected in the field of manufacture of semiconductors and other fields.

(B) If the procedure (i) or (ii) in the methods of the invention is carried out during molding of fluorine-containing resin, a cleaning procedure need not be conducted on the molded product.

Given below are Examples and Comparison Examples to clarify the features of the present invention in greater detail.

COMPARISON EXAMPLE 1

Two kinds of molded bottles each made of tetrafluoroethylene-perfluoroalkyl vinyl ether copolymer (hereinafter referred to as "PFA bottle") and tetrafluoroethylene-hexafluoropropylene copolymer (hereinafter referred to as "FEP bottle"), respectively were cleaned with ultrapure water (specific resistance [MΩ.cm at 25° C.]: at least 18, number of fine particles [number of particles/ml, having a size of not smaller than 0.3 μm]: 1 or less, T.O.C. [ppb]: 10 to 100, ultrapure water of this type will be also used hereinafter) in the order as shown below in Table 1.

The bottles were cleaned by pouring an appropriate quantity of ultrapure water into each bottle, shaking the bottle under the conditions of vibrational amplitude of 4 cm and the number of vibration of 160 vibrations/min for 5 minutes and allowing the bottle to stand. The number of fine particles was counted with use of a counter for counting the number of fine particles in liquid (trade name "RION KL-21", manufactured by RION Co., Ltd.**). Table 1 shows the number of fine particles present in ultrapure water and having a size of at least 0.3 μm or at least 0.5 μm after completion of each cleaning procedure.

Further, a 40% aqueous solution of NH4F or a 50% aqueous solution of HF from which fine particles were removed beforehand by filtration using a filter (0.1 μm) was poured into the bottles for cleaning the bottles internally thereof in the same manner as above. Table 1 also shows the number of fine particles counted in this case.

In the following Examples and Comparison Examples, cleaning with ultrapure water was conducted in the same manner as in this Comparison Example unless otherwise specified. Further, 40% aqueous solutions of NH4F and 50% aqueous solutions of HF were filtered by the same procedure as above and used in the following cleaning operations.

Each value shown in the following tables and obtained using PFA bottles is the average of two data determined by actual count, and that obtained using FEP bottles is the average of three such data.

Table 1 shows how the number of fine particles changes through the intermediate stages in the cleaning method using ultrapure water which is one of the conventional cleaning techniques.

In the following Examples and Comparison Examples, the degree of the improvement of cleaning effect is evaluated by comparison with the results shown in Table 1.

EXAMPLE 1

A molded 0.5 l-PFA bottle and a molded 1 l-FEP bottle were cleaned once with ultrapure water in the same manner as in Comparison Example 1 and thereafter maintained at a high temperature in the atmospheric ambience under the following conditions. The bottles thus treated were further cleaned with ultrapure water four times in the same manner as in Comparison Example 1. Furthermore, a 40% aqueous solution of NH4F or a 50% aqueous solution of HF was used for washing the bottles by the same procedure as in Comparison Example 1.

Conditions for Maintaining the Bottles

*0.5 l-PFA bottle
Temperature: 250° C.
Time: 30 min
*1 l-FEP bottle
Temperature: 200° C.
Time: 30 min Table 2 shows the results.

TABLE 1

| Particle size | 0.5 l Bottle of PFA | | 1 l Bottle of FEP | | 1 l Bottle of FEP | |
|---|---|---|---|---|---|---|
| | ≧0.3 μm | ≧0.5 μm | ≧0.3 μm | ≧0.5 μm | ≧0.3 μm | ≧0.5 μm |
| Number of fine particles Cleaning with super-pure water | | | | | | |
| 1st cleaning (np*/ml) | 2894 | 440 | 1380 | 556 | 2257 | 864 |
| Procedure of invention | | | None | | | |
| 2nd cleaning (np/ml) | 401 | 25.4 | 681 | 69.8 | 1980 | 1084 |
| 3rd cleaning (np/ml) | 135 | 3.4 | 209 | 16.1 | 1697 | 696 |
| 4th cleaning (np/ml) | 47.2 | 1.5 | 226 | 31.7 | 1226 | 467 |
| 5th cleaning (np/ml) | 16.1 | 0.5 | 112 | 14.8 | 770 | 319 |
| Cleaning with 40% NH4F | | | | | | |
| 1st cleaning (np/ml) | 80.0 | 9.0 | 207 | 14.1 | — | — |
| 2nd cleaning (np/ml) | 13.3 | 1.3 | 167 | 14.7 | — | — |
| Cleaning with 50% HF | | | | | | |
| 1st cleaning (np/ml) | — | — | — | — | 173 | 12.2 |
| 2nd cleaning (np/ml) | — | — | — | — | 29.5 | 1.1 |

*The mark "np" means the number of particles

TABLE 2

| Temperature Particle size | 0.5 l Bottle of PFA 250° C. | | 1 l Bottle of FEP 200° C. | | 1 l Bottle of FEP 200° C. | |
|---|---|---|---|---|---|---|
| | ≧0.3 μm | ≧0.5 μm | ≧0.3 μm | ≧0.5 μm | ≧0.3 μm | ≧0.5 μm |
| Number of fine particles Cleaning with super-pure water | | | | | | |
| 1st cleaning (np*/ml) | 2701 | 339 | 966 | 274 | 2457 | 479 |
| Procedure of Invention | Maintained at high temperature | | | | | |
| 2nd cleaning (np/ml) | 51.1 | 1.1 | 70.1 | 2.3 | 176 | 2.0 |
| 3rd cleaning (np/ml) | 4.0 | 0.5 | 14.6 | 1.7 | 51.6 | 2.0 |
| 4th cleaning (np/ml) | 4.1 | 0.3 | 10.1 | 0.8 | 27.3 | 0.7 |
| 5th cleaning (np/ml) | 3.3 | 0.1 | 7.8 | 0.2 | 37.0 | 0.8 |
| Cleaning with 40% NH4F | | | | | | |
| 1st cleaning (np/ml) | 22.8 | 3.8 | 18.8 | 0.5 | — | — |
| 2nd cleaning (np/ml) | 6.8 | 0.6 | 19.4 | 0.6 | — | — |
| Cleaning with 50% HF | | | | | | |
| 1st cleaning (np/ml) | — | — | — | — | 9.1 | 1.2 |
| 2nd cleaning (np/ml) | — | — | — | — | 2.9 | 0.3 |

*The mark "np" means the number of particles

The comparison between Table 1 and Table 2 reveals that the number of fine particles is reduced by maintaining the molded bottles made of fluorine-containing resin in an atmosphere of high temperature. Presumably, this is because the particulate component present in the fluorine-containing resin evaporates off in an atmosphere of high temperature.

EXAMPLE 2

After cleaned once with ultrapure water in the same manner as in Comparison Example 1, a molded 0.5 l-PFA bottle was maintained at a high temperature in the atmospheric ambience under the following conditions. Thereafter the bottle was further cleaned four times with ultrapure water by the same procedure as in Comparison Example 1. Moreover, a 40% aqueous solution of NH₄F was used for washing the bottle in the same manner as in Comparison Example 1.

Conditions for Maintaining the Bottle

Temperature: 150° C., 200° C. and 250° C.
Time: 30 min
Table 3 shows the results.

EXAMPLE 3

A molded 0.5 l-PFA bottle was cleaned once with ultrapure water in the same manner as in Comparison Example 1 and was maintained at a high temperature in the atmospheric ambience under the following conditions. The bottle was further cleaned four times with ultrapure water by the same procedure as in Comparison Example 1. Further, a 40% aqueous solution of NH₄F was used for cleaning the bottle in the same manner as in Comparison Example 1.

Conditions for Maintaining the Bottle

Temperature 250° C.
Time: 0.5 min, 1 min, 5 min, 10 min and 30 min
Table 4 shows the results.

TABLE 4

| Condition | 0.5 l Bottle of PFA (250° C., 0.5 min.) | | 0.5 l Bottle of PFA (250° C., 1 min.) | | 0.5 l Bottle of PFA (250° C., 5 min.) | | 0.5 l Bottle of PFA (250° C., 10 min.) | | 0.5 l Bottle of PFA (250° C., 30 min.) | |
|---|---|---|---|---|---|---|---|---|---|---|
| Particle size | ≧0.3 μm | ≧0.5 μm | ≧0.3 μm | ≧0.5 μm | ≧0.3 μm | ≧0.5 μm | ≧0.3 μm | ≧0.5 μm | ≧0.3 μm | ≧0.5 μm |
| Number of fine particles Cleaning with super-pure water | | | | | | | | | | |
| 1st cleaning (np*/ml) | 1040 | 84.4 | 426 | 33.1 | 1276 | 155 | 773 | 69.3 | 2701 | 339 |
| Procedure of Invention | Maintained at high temperature | | | | | | | | | |
| 2nd cleaning (np/ml) | 89.1 | 1.8 | 37.5 | 0.8 | 58.4 | 1.7 | 18.1 | 0.7 | 51.1 | 1.1 |
| 3rd cleaning (np/ml) | 41.9 | 0.9 | 15.2 | 0.6 | 33.7 | 1.0 | 7.6 | 0.6 | 4.0 | 0.5 |
| 4th cleaning (np/ml) | 20.1 | 0.4 | 10.3 | 0.3 | 9.6 | 0.6 | 5.3 | 0.3 | 4.1 | 0.3 |
| 5th cleaning (np/ml) | 9.2 | 0.2 | 7.2 | 0.2 | 5.3 | 0.1 | 3.0 | 0.1 | 3.3 | 0.1 |
| Cleaning with 40% NH₄F | | | | | | | | | | |
| 1st cleaning (np/ml) | 44.9 | 1.9 | 26.0 | 1.9 | 13.7 | 0.9 | 12.0 | 1.3 | 22.8 | 3.8 |
| 2nd cleaning (np/ml) | 10.4 | 0.5 | 8.2 | 0.5 | 4.6 | 0.1 | 4.4 | 0.1 | 6.8 | 0.6 |

*The mark "np" means the number of particles
(Note) Data for 30 minutes are the same as in Table 2

TABLE 3

| Condition | 0.5 l Bottle of PFA (150° C., 30 min.) | | 0.5 l Bottle of PFA (200° C., 30 min.) | | 0.5 l Bottle of PFA (250° C., 30 min.) | |
|---|---|---|---|---|---|---|
| Particle size | ≧0.3 μm | ≧0.5 μm | ≧0.3 μm | ≧0.5 μm | ≧0.3 μm | ≧0.5 μm |
| Number of fine particles Cleaning with super-pure water | | | | | | |
| 1st cleaning (np*/ml) | 1721 | 233 | 2428 | 34.1 | 2701 | 339 |
| Procedure of Invention | Maintained at high temperature | | | | | |
| 2nd cleaning (np/ml) | 371 | 25.3 | 244 | 9.8 | 51.1 | 1.1 |
| 3rd cleaning (np/ml) | 127 | 6.9 | 23.7 | 1.2 | 4.0 | 0.5 |
| 4th cleaning (np/ml) | 74.6 | 2.4 | 13.8 | 0.6 | 4.1 | 0.3 |
| 5th cleaning (np/ml) | 48.9 | 1.2 | 11.5 | 0.6 | 3.3 | 0.1 |
| Cleaning with 40% NH₄F | | | | | | |
| 1st cleaning (np/ml) | 93.1 | 14.4 | 69.6 | 12.0 | 22.8 | 3.8 |
| 2nd cleaning (np/ml) | 18.4 | 1.3 | 12.4 | 1.1 | 6.8 | 0.6 |

*The mark "np" means the number of particles
(Note) Data at 250° C. are the same as in Table 2

By comparison between the results as shown in Table 1 and those shown in Table 3 with respect to 0.5 l-PFA bottle, it is clear that the effect of removing fine particles is improved with the rise of the temperature. Since the particulate component is removed by evaporation in this Example, it is desirable to heat the bottles at a higher temperature insofar as the applied temperature does not adversely affect the bottles.

By comparison between the results as shown in Table 1 and those shown in Table 4 with regard to the 0.5 l-PFA bottle, it is revealed that when the bottle is maintained at 250° C., the number of fine particles is reduced by maintaining the bottle for only 0.5 minute. When the bottle is maintained for 10 minutes or longer, a large number of fine particles evaporate off, whereby little or no quantity of fine particles remain.

EXAMPLE 4

A molded 0.5 l-PFA bottle and a molded 1 l-FEP bottle were internally cleaned once with ultrapure water in the same manner as in Comparison Example 1. The bottles were charged with an $F_2$-containing gas (15% $F_2$-85% $N_2$) and were retained under the following conditions.

|  | Time for which $F_2^-$ containing gas was retained (hr) | Heating temperature (°C.) | Heating time (min) |
|---|---|---|---|
| PFA, 0.5 l | 12 | 30 | — |
| PFA, 0.5 l | 4 | 250 | 30 |
| FEP, 1 l | 4 | 200 | 30 |
| FEP, 1 l | 4 | 200 | 30 |

The bottles were further cleaned with ultrapure water four times by the same procedure as in Comparison Example 1. Moreover, a 40% aqueous solution of $NH_4F$ or a 50% aqueous solution of HF was used for cleaning the bottles in the same manner as in Comparison Example 1.

Table 5 shows the results.

| Time for which $F_2^-$ containing gas was retained (hr) | Heating temperature (°C.) | Heating time (min) |
|---|---|---|
| 12 | 30 | — |
| 4 | 75 | 30 |
| 4 | 100 | 30 |
| 4 | 125 | 30 |
| 4 | 150 | 30 |
| 4 | 200 | 30 |
| 4 | 250 | 30 |

Then the bottle was further cleaned with ultrapure water four times in the same manner as in Comparison Example 1. Moreover, a 40% aqueous solution of $NH_4F$ was used for cleaning the bottle by the same procedure as in Comparison Example 1.

Table 6 shows the results.

TABLE 6

| Temperature | 0.5 l Bottle of PFA (about 30° C.) | | 0.5 l Bottle of PFA (75° C.) | | 0.5 l Bottle of PFA (100° C.) | | 0.5 l Bottle of PFA (125° C.) | | 0.5 l Bottle of PFA (150° C.) | | 0.5 l Bottle of PFA (200° C.) | | 0.5 l Bottle of PFA (250° C.) | |
|---|---|---|---|---|---|---|---|---|---|---|---|---|---|---|
| Particle size | ≧0.3 μm | ≧0.5 μm | ≧0.3 μm | ≧0.5 μm | ≧0.3 μm | ≧0.5 μm | ≧0.3 μm | ≧0.5 μm | ≧0.3 μm | ≧0.5 μm | ≧0.3 μm | ≧0.5 μm | ≧0.3 μm | ≧0.5 μm |
| Number of fine particles Cleaning with super-pure water | | | | | | | | | | | | | | |
| 1st cleaning (np*/ml) | 531 | 41.1 | 2905 | 412 | 1569 | 204 | 822 | 93.8 | 2132 | 250 | 1994 | 234 | 1517 | 189 |
| Procedure of Invention | Maintained in fluorine gas atmosphere | | | | | | | | | | | | | |
| 2nd cleaning (np/ml) | 17.4 | 2.9 | 10.4 | 4.1 | 27.3 | 2.4 | 11.5 | 1.0 | 51.4 | 14.7 | 35.4 | 8.4 | 67.1 | 14.1 |
| 3rd cleaning (np/ml) | 5.0 | 0.9 | 2.3 | 0.4 | 12.8 | 1.5 | 5.1 | 0.6 | 4.1 | 1.0 | 4.9 | 0.7 | 6.7 | 0.7 |
| 4th cleaning (np/ml) | 2.0 | 0.3 | 2.4 | 0.6 | 5.6 | 0.8 | 2.7 | 0.2 | 5.1 | 1.2 | 3.3 | 0.3 | 2.7 | 0.5 |
| 5th cleaning (np/ml) | 1.4 | 0.1 | 1.8 | 0.3 | 2.4 | 0.3 | 2.1 | 0.1 | 2.2 | 0.4 | 2.2 | 0.5 | 2.2 | 0.3 |
| Cleaning with 40% $NH_4F$ | | | | | | | | | | | | | | |
| 1st cleaning (np/ml) | 9.5 | 1.2 | 4.8 | 0.9 | 7.9 | 0.6 | 4.4 | 0.3 | 23.6 | 5.1 | 17.2 | 3.0 | 17.1 | 3.0 |
| 2nd cleaning (np/ml) | 4.2 | 0.7 | 2.3 | 0.3 | 3.6 | 0.2 | 3.0 | 0.1 | 4.6 | 0.8 | 2.5 | 0.4 | 2.7 | 0.4 |

*The mark "np" means the number of particles
(Note) Data at 250° C. are the same as in Table 5

TABLE 5

| Temperature | 0.5 l Bottle of PFA (about 30° C.) | | 0.5 l Bottle of PFA (250° C.) | | 1 l Bottle of FEP (200° C.) | | 1 l Bottle of FEP (200° C.) | |
|---|---|---|---|---|---|---|---|---|
| Particle size | ≧0.3 μm | ≧0.5 μm | ≧0.3 μm | ≧0.5 μm | ≧0.3 μm | ≧0.5 μm | ≧0.3 μm | ≧0.5 μm |
| Number of fine particles Cleaning with super-pure water | | | | | | | | |
| 1st cleaning (np*/ml) | 531 | 41.1 | 1517 | 189 | 1598 | 239 | 2818 | 1169 |
| Procedure of Invention | Maintained in fluorine gas atmosphere | | | | | | | |
| 2nd cleaning (np/ml) | 17.4 | 2.9 | 67.1 | 14.1 | 50.8 | 14.4 | 34.0 | 4.4 |
| 3rd cleaning (np/ml) | 5.0 | 0.9 | 6.7 | 0.7 | 5.9 | 1.0 | 9.8 | 1.0 |
| 4th cleaning (np/ml) | 2.0 | 0.3 | 2.7 | 0.5 | 1.5 | 0.2 | 3.5 | 0.5 |
| 5th cleaning (np/ml) | 1.4 | 0.1 | 2.2 | 0.3 | 1.1 | 0.3 | 3.4 | 0.3 |
| Cleaning with 40% $NH_4F$ | | | | | | | | |
| 1st cleaning (np/ml) | 9.5 | 1.2 | 17.1 | 3.0 | 17.1 | 3.1 | — | — |
| 2nd cleaning (np/ml) | 4.2 | 0.7 | 2.7 | 0.4 | 6.7 | 1.0 | — | — |
| Cleaning with 50% HF | | | | | | | | |
| 1st cleaning (np/ml) | — | — | — | — | — | — | 1.7 | 0.5 |
| 2nd cleaning (np/ml) | — | — | — | — | — | — | 1.2 | 0.2 |

*The mark "np" means the number of particles

The results as shown in Table 5 clearly indicate that the $F_2$-containing gas, when introduced into a container made of fluorine-containing resin, exhibits cleaning effect even at ordinary temperature.

EXAMPLE 5

A molded 0.5 l-PFA bottle was cleaned with ultrapure water once by the same procedure as in Comparison Example 1. Thereafter the bottle was charged with an $F_2$-containing gas (15% $F_2$-85% $N_2$) and maintained under the following conditions.

The results shown in Table 6 indicate that a cleaning effect is recognized when the bottle made of fluorine-containing resin is filled with $F_2$-containing gas regardless of the temperature at which the bottle is maintained. This is because the particulate component present in the bottle reacts with the $F_2$-containing gas. Consequently, the particulate component is removed presumably by the following phenomena.

(a) A fluorine-containing compound is obtained as the reaction product, is lowered in boiling point and thus evaporates off.

(b) A reaction product high in solubility in water is obtained, markedly dissolved in ultrapure water and removed.

(c) The reaction product is introduced into the polymer of fluorine-containing resin and integrated with the bottle.

In Examples 4 and 5, use of a fluorine-containing gas such as $ClF_3$, $NF_3$ or the like in place of the $F_2$-containing gas produces substantially the same outstanding effect.

EXAMPLE 6

A molded 0.5 l-PFA bottle and a molded 1 l-FEP bottle were internally cleaned with ultrapure water once in the same manner as in Comparison Example 1 and treated with ω-hydrocarboxylic acid [$H(CF_2CF_2)_3COOH$] or acetone [$CH_3COCH_3$]. Such treatment was conducted by pouring ω-hydrocarboxylic acid or acetone into the bottle and shaking the bottle under the conditions of a vibrational amplitude of 4 cm and the number of vibration of 160 vibrations/min for 5 minutes.

In order to evaluate the effect produced by the treatment with the above solvents, the bottle was further cleaned four times with ultrapure water in the same manner as in Comparison Example 1. Thereafter, a 40% aqueous solution of $NH_4F$ or a 50% aqueous solution of HF was used for cleaning the bottles.

Table 7 shows the results.

The results shown in Table 7 clearly indicate that cleaning effect is remarkably improved by cleaning the molded bottle of fluorine-containing resin with the above solvent. This is presumably because the particulate component present in the molded product of fluorine-containing resin is dissolved in the solvent and removed.

We claim:

1. A method for removing the fine particles deposited on an article of fluorine-containing resin, the method comprising conducting at least one of the procedures of:
   (i) maintaining the article of fluorine-containing resin at a temperature ranging from 100° C. to a temperature lower than the melting point of the article,
   (ii) maintaining the article in the atmosphere of a gaseous compound containing fluorine, and
   (iii) bringing the article into contact with a polar solvent or an aqueous solution of polar solvent in an amount sufficient to remove the fine particles.

2. A method as defined in claim 1 in which the article is maintained at a temperature of not lower than 150° C. in the procedure (i).

3. A method as defined in claim 1 in which the fluorine-containing gas used in the procedure (ii) is a gas capable of acting as a fluorinating agent or an oxidizing agent.

4. A method as defined in claim 3 in which the fluorine-containing gas used in the procedure (ii) is at least one gas selected from the group consisting of gases of

TABLE 7

| Solvent | 0.5 l Bottle of PFA ω-Hydrocarboxylic acid $H(CF_2CF_2)_3COOH$ | | 0.5 l Bottle of PFA Acetone $CH_3COCH_3$ | | 1 l Bottle of FEP ω-Hydrocarboxylic acid $H(CF_2CF_2)_3COOH$ | |
|---|---|---|---|---|---|---|
| Particle size | ≧0.3 μm | ≧0.5 μm | ≧0.3 μm | ≧0.5 μm | ≧0.3 μm | ≧0.5 μm |
| Number of fine particles | | | | | | |
| Cleaning with super-pure water | | | | | | |
| 1st cleaning (np*/ml) | 1895 | 235 | 2836 | 407 | 968 | 361 |
| Procedure of Invention | Contacted with Solvent | | | | | |
| 2nd cleaning (np/ml) | 13.6 | 0.8 | 51.8 | 1.8 | 221 | 57.8 |
| 3rd cleaning (np/ml) | 6.8 | 1.2 | 46.4 | 2.9 | 34.5 | 2.3 |
| 4th cleaning (np/ml) | 2.5 | 0.6 | 18.0 | 0.9 | 4.6 | 0.4 |
| 5th cleaning (np/ml) | 3.1 | 0.7 | 10.6 | 0.7 | 6.5 | 1.5 |
| Cleaning with 40% $NH_4F$ | | | | | | |
| 1st cleaning (np/ml) | 38.0 | 3.9 | 50.6 | 11.4 | 25.1 | 2.4 |
| 2nd cleaning (np/ml) | 6.8 | 1.1 | 4.4 | 0.6 | 4.4 | 0.4 |
| Cleaning with 50% HF | | | | | | |
| 1st cleaning (np/ml) | — | — | — | — | — | — |
| 2nd cleaning (np/ml) | — | — | — | — | — | — |

| Solvent | 1 l Bottle of FEP ω-Hydrocarboxylic acid $H(CF_2CF_2)_3COOH$ | | 1 l Bottle of FEP Acetone $CH_3COCH_3$ | | 1 l Bottle of FEP Acetone $CH_3COCH_3$ | |
|---|---|---|---|---|---|---|
| Particle size | ≧0.3 μm | ≧0.5 μm | ≧0.3 μm | ≧0.5 μm | ≧0.3 μm | ≧0.5 μm |
| Number of fine particles | | | | | | |
| Cleaning with super-pure water | | | | | | |
| 1st cleaning (np*/ml) | 2400 | 692 | 742 | 228 | 803 | 287 |
| Procedure of Invention | Contacted with Solvent | | | | | |
| 2nd cleaning (np/ml) | 9.6 | 0.2 | 60.2 | 2.1 | 26.3 | 7.1 |
| 3rd cleaning (np/ml) | 15.6 | 1.1 | 43.6 | 1.7 | 83.9 | 30.4 |
| 4th cleaning (np/ml) | 15.6 | 0.6 | 17.9 | 1.8 | 63.7 | 15.7 |
| 5th cleaning (np/ml) | 19.2 | 0.8 | 10.3 | 0.6 | 19.0 | 8.8 |
| Cleaning with 40% $NH_4F$ | | | | | | |
| 1st cleaning (np/ml) | — | — | 27.9 | 1.7 | — | — |
| 2nd cleaning (np/ml) | — | — | 29.4 | 1.8 | — | — |
| Cleaning with 50% HF | | | | | | |
| 1st cleaning (np/ml) | 1.4 | 0 | — | — | 4.8 | 1.2 |
| 2nd cleaning (np/ml) | 1.7 | 0.1 | — | — | 4.4 | 0.5 |

*The mark "np" means the number of particles $F_2$, $ClF_5$, $ClF_3$, $ClF$, $BrF_5$, $BrF_3$, $BrF$, $ClO_3F$, $SF_4$, $O_2F_2$ and $NF_3$, the gas being one diluted or not diluted with an inactive gas.

5. A method as defined in claim 3 in which the gas is maintained at a temperature higher than room temperature in the procedure (ii).

6. A method as defined in claim 1 in which the polar solvent used in the procedure (iii) is at least one solvent selected from the group consisting of fluorine-containing carboxylic acids represented by the formula $R_fCOOH$ (wherein $R_f$ is a fluorine-containing hydrocarbon group having 3 to 20 carbon atoms) and ketones represented by the formula $R^1COR^2$ (wherein $R^1$ and $R^2$ are the same or different and each represent an alkyl group having 1 to 5 carbon atoms).

7. A method as defined in claim 1 in which the article is cleaned at least once with superpure water and/or a cleaning agent before or after, or both before and after, conducting at least one of the procedures (i), (ii) and (iii).

* * * * *